United States Patent
Tsuji et al.

(10) Patent No.: US 11,554,784 B2
(45) Date of Patent: Jan. 17, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Kanta Tsuji, Wako (JP); Akihiko Aoyagi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/560,337

(22) Filed: Dec. 23, 2021

(65) Prior Publication Data

US 2022/0204006 A1    Jun. 30, 2022

(30) Foreign Application Priority Data

Dec. 28, 2020  (JP) .............................. JP2020-218697

(51) Int. Cl.
| | |
|---|---|
| *B60W 50/029* | (2012.01) |
| *B60W 50/02* | (2012.01) |
| *B60W 50/08* | (2020.01) |
| *B60W 30/165* | (2020.01) |
| *B60W 30/12* | (2020.01) |

(Continued)

(52) U.S. Cl.
CPC .......... *B60W 50/029* (2013.01); *B60W 10/20* (2013.01); *B60W 30/12* (2013.01);
(Continued)

(58) Field of Classification Search
CPC .......... B60W 50/029; B60W 50/0205; B60W 50/082; B60W 10/20; B60W 30/12; B60W 30/143; B60W 30/165
(Continued)

(56) References Cited

U.S. PATENT DOCUMENTS

| 10,996,672 B2 * | 5/2021 | Sato .................... B60W 50/029 |
| 2018/0154938 A1 * | 6/2018 | Kataoka ............... B62D 15/025 |

(Continued)

FOREIGN PATENT DOCUMENTS

| CN | 111527532 | 8/2020 |
| CN | 111727145 | 9/2020 |

(Continued)

OTHER PUBLICATIONS

Japanese Office Action for Japanese Patent Application No. 2020-218697 dated Jun. 1, 2021.

(Continued)

*Primary Examiner* — Peter D Nolan
*Assistant Examiner* — Luke Huynh
(74) *Attorney, Agent, or Firm* — Amin, Turocy & Watson, LLP

(57) ABSTRACT

Provided is a vehicle control device configured to: recognize a surrounding situation of a vehicle; control steering and acceleration/deceleration of the vehicle; detect operation states of a plurality of external recognition sensors; determine a driving mode of the vehicle as any one of a plurality of driving modes including a first driving mode, a second driving mode, and a third driving mode; change the third driving mode to either one of the first driving mode and the second driving mode when determining that a failure has occurred in one of the plurality of external recognition sensors that implement: a function of causing the vehicle to follow a preceding vehicle; and a function of assisting the vehicle in keeping a lane; and change the third driving mode to the second driving mode when determining that degradation in performance has occurred in one of the plurality of external recognition sensors.

9 Claims, 5 Drawing Sheets

| DRIVING MODE | CONTROL STATE | TASK | |
|---|---|---|---|
| MODE A | AUTOMATIC DRIVING | MONITORING OF FRONT FIELD:UNNECESSARY GRASP OF STEERING WHEEL:UNNECESSARY | ↑ TASK:LIGHTER |
| MODE B | DRIVING ASSISTANCE | MONITORING OF FRONT FIELD:NECESSARY GRASP OF STEERING WHEEL:UNNECESSARY | |
| MODE C | DRIVING ASSISTANCE | MONITORING OF FRONT FIELD:NECESSARY GRASP OF STEERING WHEEL:NECESSARY | |
| MODE D | DRIVING ASSISTANCE | MONITORING OF FRONT FIELD:NECESSARY AT LEAST SOME DRIVING OPERATION IS REQUIRED | |
| MODE E | MANUAL DRIVING | MONITORING OF FRONT FIELD:NECESSARY DRIVING OPERATION IS REQUIRED FOR BOTH OF STEERING AND ACCELERATION/DECELERATION | ↓ TASK:HEAVIER |

(51) Int. Cl.
*B60W 10/20* (2006.01)
*B60W 30/14* (2006.01)

(52) U.S. Cl.
CPC ........ *B60W 30/143* (2013.01); *B60W 30/165* (2013.01); *B60W 50/0205* (2013.01); *B60W 50/082* (2013.01); *B60W 2050/0215* (2013.01)

(58) Field of Classification Search
USPC .......................................................... 701/29
See application file for complete search history.

(56) References Cited

U.S. PATENT DOCUMENTS

| | | | |
|---|---|---|---|
| 2019/0061745 A1* | 2/2019 | Hatano | ............. B60W 60/0053 |
| 2019/0220007 A1* | 7/2019 | Konishi | ................ B60W 50/00 |
| 2019/0227546 A1 | 7/2019 | Sato | |

FOREIGN PATENT DOCUMENTS

| | | |
|---|---|---|
| JP | 2016-179767 | 10/2016 |
| JP | 2019-142246 | 8/2019 |
| JP | 2019-209889 | 12/2019 |
| JP | 2020-166667 | 10/2020 |
| WO | 2018/225225 | 12/2018 |

OTHER PUBLICATIONS

Japanese Decision to Grant a Patent for Japanese Patent Application No. 2020-218697 dated Aug. 10, 2021.
Chinese Office Action for Chinese Patent Application No. 202111596235.8 dated Aug. 29, 2022.

* cited by examiner

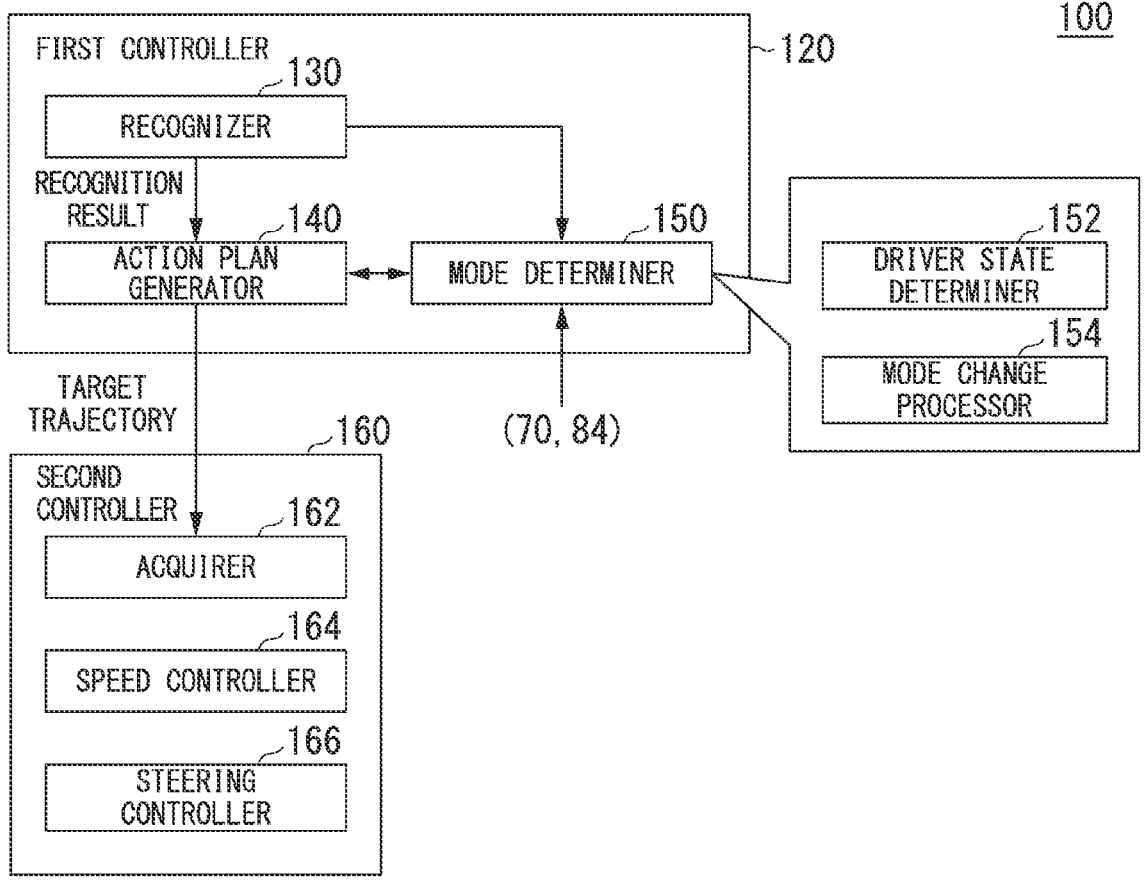

VEHICLE CONTROL DEVICE, VEHICLE CONTROL METHOD, AND STORAGE MEDIUM

CROSS-REFERENCE TO RELATED APPLICATION

The application is based on Japanese Patent Application No. 2020-218697 filed on Dec. 28, 2020, the content of which incorporated herein by reference.

BACKGROUND

Field of the Invention

The present invention relates to a vehicle control device, a vehicle control method, and a storage medium.

Description of Related Art

In a vehicle control system that can handle automatic driving, the technology of safely evacuating and stopping a vehicle when a driver does not perform an operation of driving the vehicle is known. For example, Japanese Patent Application Laid-open No. 2020-166667 discloses the technology of executing the processing of stopping a vehicle within an allowable period when a predetermined condition indicating that continuation of driving of the vehicle by a driver is difficult is satisfied.

SUMMARY

However, the technology described in Japanese Patent Application Laid-open No. 2020-166667 relates to control at a time when continuation of driving of the vehicle by a driver is difficult, and does not consider a case in which continuation of driving of the vehicle becomes difficult due to occurrence of an abnormality in a sensor required for automatic driving. As a result, appropriate control cannot be performed in some cases when an abnormality has occurred in a sensor required for automatic driving.

The present invention has been made in view of the above-mentioned circumstances, and has an object to provide a vehicle control device, a vehicle control method, and a storage medium, which are capable of performing appropriate control when an abnormality has occurred in a sensor required for automatic driving.

A vehicle control device according to the present invention adopts the following configuration.

According to the aspects of (1) to (6), it is possible to perform appropriate control when an abnormality has occurred in a sensor required for automatic driving.

BRIEF DESCRIPTION OF THE DRAWINGS

FIG. 2 is a functional configuration diagram of a first controller and a second controller.

FIG. 3 is a diagram illustrating an example of a correspondence relationship among a driving mode, a control state of an own vehicle, and a task.

DESCRIPTION OF EMBODIMENTS

Now, description is given of a vehicle control device, a vehicle control method, and a storage medium according to embodiments of the present invention with reference to the drawings.

First Embodiment

[Overall Configuration]

Figure 1:
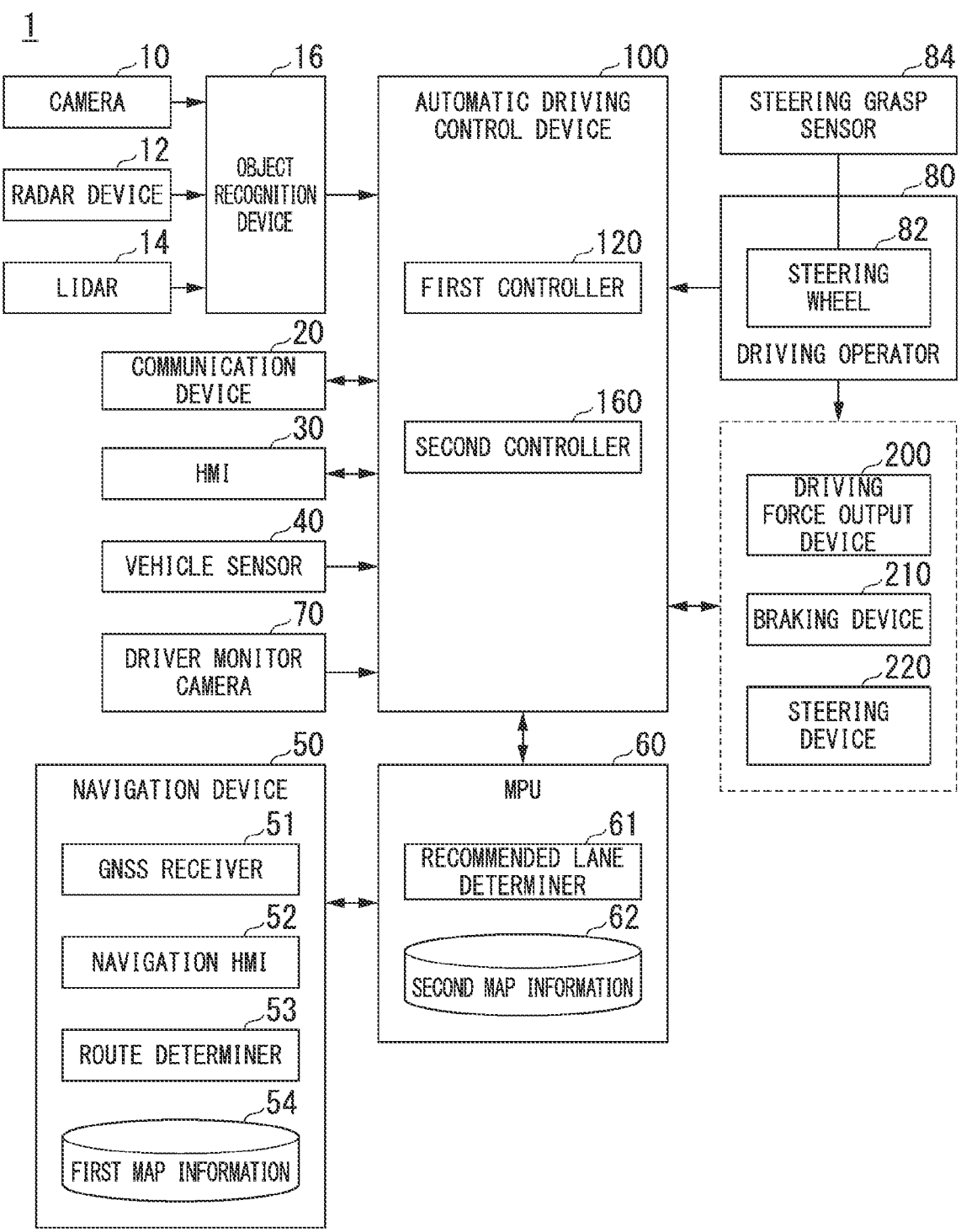
FIG. 1 is a configuration diagram of a vehicle system that uses a vehicle control device according to a first embodiment.

FIG. 1 is a configuration diagram of a vehicle system 1 that uses a vehicle control device according to a first embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driver monitoring camera 70, a driving operator 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added. The camera 10, the radar device 12, and the LIDAR 14 are hereinafter sometimes referred to as "external recognition sensor".

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "own vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the own vehicle M periodically, for example. The camera 10 may be a stereo camera.

The radar device 12 radiates a radio wave such as a millimeter wave toward the surroundings of the own vehicle M, and detects a radio wave (reflected wave) reflected by an object, to detect at least the position (distance and direction) of the object. The radar device 12 is mounted on any part of the own vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the own vehicle M, and measures diffused light. The LIDAR 14 detects a distance to a target based on a period of time since emission of light until reception of light. The light to be radiated is, for example, pulsed laser light. The LIDAR 14 is mounted on any part of the own vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1. The object recognition device 16 further recognizes the operation states of the camera 10, the radar device 12, and the LIDAR 14, and transmits the recognized operation states to the recognizer 130.

The communication device 20 uses, for example, a cellular network, a Wi-Fi network, Bluetooth (trademark), or DSRC (Dedicated Short Range Communication) to communicate with another vehicle existing near the own vehicle M or communicate with various kinds of server devices via a radio base station.

The HMI 30 presents various kinds of information to an occupant of the own vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the own vehicle M, an acceleration sensor that detects an acceleration, a yaw rate sensor that detects an angular speed with respect to a vertical axis, and an orientation sensor that detects an orientation of the own vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the own vehicle M based on a signal received from a GNSS satellite. The position of the own vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determiner 53 refers to the first map information 54 to determine a route (hereinafter referred to as "map route") from the position (or any input position) of the own vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended lane for each block with reference to the second map information 62. The recommended lane determiner 61 determines on which lane the own vehicle M is to travel. When there is a junction on a map route, the recommended lane determiner 61 determines a recommended route so that the own vehicle M can travel on a route for efficiently entering the junction.

The second map information 62 is map information having higher precision than that of the first map information 54. The second map information 62 includes, for example, information on the center of a lane or information on the boundary of a lane. The second map information 62 may include, for example, road information, traffic regulation information, address information (address or postal code), facility information, phone number information, and information on a section in which a mode A or mode B described later is prohibited. The second map information 62 may be updated appropriately through communication between the communication device 20 and another device.

A driver monitor camera 70 is, for example, a digital camera that uses a solid-state image pickup device such as a CCD image sensor or a CMOS image sensor. The driver monitor camera 70 is mounted on any part of the own vehicle M at a position and in a direction so as to be capable of picking up a front image of a head of an occupant (hereinafter referred to as "driver") sitting on a driver seat of the own vehicle M (in the direction of picking up an image of the face). For example, the driver monitor camera 70 is mounted on an upper part of a display device provided on the center of an instrumental panel of the own vehicle M.

The driving operator 80 includes, for example, an acceleration pedal, a brake pedal, a gear shift, and other operators in addition to the steering wheel 82. A sensor that detects an operation amount or whether an operation is performed is mounted on the driving operator 80, and the detection result is output to the automatic driving control device 100 or a part or all of the driving force output device 200, the braking device 210, and the steering device 220. The steering wheel 82 is an example of an "operator that receives a steering operation performed by a driver". The operator is not always required to have a ring shape, and may have other shapes for steering, or may be a joystick or a button. A steering grasp sensor 84 is attached to the steering wheel 82. The steering grasp sensor 84 is implemented by, for example, a capacitive sensor, and outputs, to the automatic driving control device 100, a signal that enables detection of whether or not the driver is grasping the steering wheel 82 (in contact with the steering wheel 82 so as to be able to apply a force).

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be attached to a drive device so that the program is installed into an HDD or a flash memory of the automatic driving control device 100. The automatic driving control device 100 is an example of "vehicle control device", and a combination of an action plan generator 140 and a second controller 160 is an example of "drive controller".

FIG. 2 is a functional configuration diagram of the first controller 120 and the second controller 160. The first controller 120 includes, for example, a recognizer 130, an action plan generator 140, and a mode determiner 150. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integral evaluation. In this manner, the reliability of automatic driving is ensured.

The recognizer 130 recognizes states such as the position, speed, and acceleration of an object near the own vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the own vehicle M to be used for control. The position of an object may be represented by a representative point such as a center of gravity or corner of the object, or may be represented by a region. The "state" of an object may include the acceleration, jerk, or "action state" (for example, whether or not the own vehicle M is changing a lane or is trying to change a lane) of the object.

The recognizer 130 recognizes, for example, a lane (traveling lane) on which the own vehicle M is traveling. For example, the recognizer 130 recognizes the traveling lane by comparing a pattern (for example, arrangement of solid lines and broken lines) of a road division line obtained from the second map information 62 with a pattern of a road division line near the own vehicle M recognized from the image photographed by the camera 10, to thereby recognize the traveling lane. In addition to the road division line, the recognizer 130 may recognize the traveling lane by recognizing a traveling path boundary (road boundary) including, for example, a road division line, the shoulder of a road, a curb, a center median, and a guardrail. The traveling lane may be recognized in consideration of the position of the own vehicle M acquired from the navigation device 50 or the result of processing by the INS. The recognizer 130 recognizes a stop line, an obstacle, red light, a toll gate, and other road events. In this recognition, the position of the own vehicle M acquired from the navigation device 50 or the result of processing by an INS may be considered. Furthermore, the recognizer 130 recognizes a stop line, an obstacle, a red light, a toll gate, and other road events.

The recognizer 130 recognizes the position or posture of the own vehicle M with respect to a traveling lane when recognizing the traveling lane. The recognizer 130 may recognize, for example, as the relative position and posture of the own vehicle M with respect to the traveling lane, a deviation of the reference point of the own vehicle M from the center of the lane and an angle with respect to a line obtained by connecting the centers of the lane in the traveling direction of the own vehicle M. Instead, the recognizer 130 may recognize, for example, the position of the reference point of the own vehicle M with respect to any side edge (road division line or road boundary) of the traveling lane as the relative position of the own vehicle M with respect to the traveling lane.

Furthermore, the recognizer 130 acquires the operation state of the external recognition sensor from the object recognition device 16, and determines whether or not degradation in performance or a failure has occurred in the external recognition sensor. The specific method of determining degradation in performance or a failure is described later.

The action plan generator 140 generates such a target trajectory that the own vehicle M travels in the future (irrespective of the operation of the driver) automatically on a recommended lane determined by the recommended lane determiner 61 in principle so as to be capable of coping with the surroundings situation of the own vehicle M. The target trajectory includes, for example, a speed component. For example, the target trajectory is represented by arranging the locations (trajectory points) to be reached by the own vehicle M. The trajectory points are locations to be reached by the own vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the own vehicle M in each sampling period. In this case, information on the target speed and the target acceleration is represented by an interval between trajectory points.

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event.

The mode determiner 150 determines a driving mode of the own vehicle M as any one of a plurality of driving modes having different tasks imposed on a driver. The mode determiner 150 includes, for example, a driver state determiner 152 and a mode change processor 154. The functions of these components are described later.

FIG. 3 is a diagram illustrating an example of a correspondence relationship among a driving mode, a control state of the own vehicle M, and a task. The driving mode of the own vehicle M includes, for example, five modes, namely, a mode A to a mode E. The control state, namely, the degree of automatic driving control of the own vehicle M is the highest for the mode A, and the degree of automatic driving control decreases in order of the mode B, the mode C, the mode D, and the mode E. In contrast, the degree of a task imposed on a driver is the smallest for the mode A, and increases in order of the mode B, the mode C, the mode D, and the mode E. The mode D or the mode E is a control state that is not automatic driving, and thus the automatic driving control device 100 has a responsibility to finish control relating to automatic driving, and cause the driving mode to transition to driving assistance or manual driving. Now, examples of details of the respective driving modes are given in the following.

The mode A relates to the state of automatic driving, and the driver does not bear any one of the tasks of monitoring the surroundings of the own vehicle M and grasping the steering wheel 82. Monitoring of the surroundings of the own vehicle M includes at least monitoring of the front field of view of the own vehicle M. However, even in the mode A, the driver is required to have a posture of being able to immediately transition to manual driving in response to a request from a system, which is mainly the automatic driving control device 100. The automatic driving indicates that both of steering and acceleration/deceleration are controlled irrespective of an operation of the driver. The front field of view means a space in the traveling direction of the own vehicle M visually recognized through a front wind shield. The mode A is a driving mode that can be executed, for example, when the own vehicle M is traveling at a speed equal to or lower than the upper limit vehicle speed (for example, about 50 [km/h]) on an expressway such as a highway, and there is a preceding vehicle for the own vehicle M to follow, which is sometimes referred to as TJP (Traffic Jam Pilot). When this condition is not satisfied, the mode determiner 150 changes the driving mode of the own vehicle M to the mode B. The mode A and/or the mode B is an example of "third driving mode", the mode C is an example of "second driving mode", and the mode D and/or the mode E is an example of "first driving mode".

The mode B relates to the state of driving assistance, and the driver bears the task of monitoring the front field of view of the own vehicle M, but does not have the task of grasping the steering wheel 82. The mode C relates to the state of driving assistance, and the driver bears the task of monitoring the front field of view, and the task of grasping the steering wheel 82. The mode D is a driving mode in which the driver is required to perform a certain degree of operation for at least one of steering and acceleration/deceleration of the own vehicle M. For example, in the mode C or the mode D, driving assistance such as ACC (Adaptive Cruise Control) or LKAS (Lane Keeping Assist System) is performed. The ACC is a function of causing the own vehicle M to follow a preceding vehicle while keeping a constant inter-vehicle distance between the own vehicle M and the preceding vehicle, and LKAS is a function of assisting the own vehicle M in keeping the lane so that the own vehicle M travels along the center of the traveling lane. The mode E refers to the state of manual driving in which the driver is required to perform a driving operation for both of steering and acceleration/deceleration, and driving assistance such as ACC or LKAS is not performed. In both of the mode D and the mode E, the driver bears the task of monitoring the front field of view of the own vehicle M.

The automatic driving control device 100 (and driving assistance device (not shown)) executes automatic lane change that depends on the driving mode. The automatic lane change includes an automatic lane change (1) required by the system and an automatic lane change (2) required by the driver. The automatic lane change (1) includes an automatic lane change for passing a preceding vehicle, which is performed when the vehicle speed of the preceding vehicle is lower than the vehicle speed of the own vehicle by a reference amount or more, and an automatic lane change (automatic lane change caused by change of recommended lane) for traveling toward the destination. The automatic lane change (2) is to change the lane of the own vehicle M toward an operation direction when the driver has operated a blinker in a case where, for example, a condition on the vehicle speed or a positional relationship with a nearby vehicle is satisfied.

In the mode A, the automatic driving control device 100 does not execute any one of the automatic lane change (1) and the automatic lane change (2). In the mode B and the mode C, the automatic driving control device 100 executes both of the automatic lane change (1) and the automatic lane change (2). In the mode D, the driving assistance device (not shown) does not execute the automatic lane change (1) but executes the automatic lane change (2). In the mode E, both of the automatic lane change (1) and the automatic lane change (2) are not executed.

When the task of the determined driving mode (hereinafter referred to as "current driving mode") is not performed by the driver, the mode determiner 150 changes the driving mode of the own vehicle M to a driving mode that imposes a heavier task.

For example, when the driver is in a posture of not being able to transition to manual driving in response to a request from the system in the mode A (for example, when the driver is continuously looking aside or when a sign that indicates a difficulty in driving is detected), the mode determiner 150 uses the HMI 30 to prompt the driver to transition to manual driving, and when the driver does not respond, the mode determiner 150 performs control of causing the own vehicle M to gradually stop at the shoulder of the road and stopping automatic driving. After automatic driving is stopped, the own vehicle M is set to the state of the mode D or the mode E, and the own vehicle M can be caused to start by a manual operation performed by the driver. The following description holds true for the case of "stopping automatic driving". When the driver is not monitoring the front field of view in the mode B, the mode determiner 150 uses the HMI 30 to prompt the driver to monitor the front field of view, and when the driver does not respond, the mode determiner 150 performs control of causing the own vehicle M to gradually stop at the shoulder of the road and stopping automatic driving. When the driver is not monitoring the front field of view or is not grasping the steering wheel 82 in the mode C, the mode determiner 150 uses the HMI 30 to prompt the driver to monitor the front field of view and/or to grasp the steering wheel 82, and when the driver does not respond, the mode determiner 150 performs control of causing the own vehicle M to gradually stop at the shoulder of the road and stopping automatic driving.

The driver state determiner 152 monitors the state of the driver and determines whether the state of the driver is a state that depends on a task in order to perform the mode change described above. For example, the driver state determiner 152 analyzes an image photographed by the driver monitor camera 70 to perform posture estimation processing, and determines whether the driver is in a posture of not being able to transition to manual driving in response to a request from the system. The driver state determiner 152 analyzes the image photographed by the driver monitor camera 70 to perform line-of-sight estimation processing, and determines whether or not the driver is monitoring the front field of view.

The mode change processor 154 performs various kinds of processing for changing the mode. For example, the mode change processor 154 gives an instruction to generate a target trajectory for causing the action plan generator 140 to stop at the shoulder, gives an activation instruction to the driving assistance device (not shown), or controls the HMI 30 to prompt the driver to perform an action.

The second controller 160 controls the driving force output device 200, the braking device 210, and the steering device 220 so that the own vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control, for example. As an example, the steering controller 166 executes feed-forward control that depends on the curvature of the road in front of the own vehicle M and feedback control based on a deviation from the target trajectory.

The driving force output device 200 outputs, to a drive wheel, a traveling driving force (torque) for causing the own vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving operator 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving operator 80, and causes a brake torque that depends on a braking operation to be output to each wheel. The braking device 210 may include, as a backup, a mechanism for transmitting the hydraulic pressure, which is caused by an operation of the brake pedal included in the driving operator 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving operator 80 to change the orientation of the steered wheel.

[Control Executed at Time of Degradation in Performance or Failure of External Recognition Sensor]

Now, description is given of control to be executed by the recognizer 130 and the mode determiner 150 in cooperation at the time of degradation in performance or failure of the external recognition sensor. This control is executed when the own vehicle M is traveling in any one of the mode A or the mode B.

As described above, the recognizer 130 determines, based on operation conditions of external recognition sensors including at least the camera 10, the radar device 12, and the LIDAR 14, whether or not degradation in performance or a failure has occurred in one of the external recognition sensors. When the recognizer 130 has determined that degradation in performance or a failure has occurred in one of the external recognition sensors, the recognizer 130 notifies the mode determiner 150 of information indicating that degradation in performance or a failure has occurred in one of the external recognition sensors. In the case of the camera 10, for example, the recognizer 130 determines that performance of the camera 10 is degraded when dirt adheres to the surface of the camera 10, or determines that the camera 10 has failed when power is not supplied to the camera 10 due to a failure in power adapter of the camera 10. In the case of the radar device, for example, the recognizer 130 determines that performance of the radar device 12 is degraded when a signal-to-noise ratio of the radar device 12 has become smaller than usual, or determines that the radar device 12 has failed when transmission of a radio wave has failed due to a failure in transmitter of the radar device 12. In the case of the LIDAR 14, for example, the recognizer 130 determines that performance of the LIDAR 14 is degraded when a foreign matter adheres to the surface of the LIDAR 14 and reflected light is immediately detected, or determines that the LIDAR 14 has failed when a lens of the LIDAR 14 is broken.

When the mode determiner 150 has received, from the recognizer 130, information indicating that at least one of the external recognition sensors is degraded, the mode determiner 150 changes the mode A or the mode B to the mode C. That is, the driver bears a task of monitoring the front field of view and a task of grasping the steering wheel 82. This is because, when at least one of the external recognition sensors is degraded, for example, performance of avoiding an obstacle by automatic driving is also degraded in some cases, and thus it is possible to cause the driver to be aware of decrease in level of automatic driving and cope with an abrupt problem by imposing the task of grasping the steering wheel 82 on the driver. As a result, it is possible to perform appropriate control when an abnormality has occurred in a sensor required for automatic driving.

When the mode determiner 150 has received from, the recognizer 130, information indicating that a failure has occurred in at least one of the external recognition sensors, the mode determiner 150 changes the mode A or the mode B to the mode E. That is, automatic driving is switched to manual driving in which the driver is required to perform operations for both of steering and acceleration/deceleration, and driving assistance such as ACC or LKAS is not performed. This is because when a failure has occurred in at least one of the external recognition sensors, continuation of automatic driving in a state in which the task of monitoring the front field of view or the task of grasping the steering wheel 82 is not imposed, like the mode A or the mode B, has a possibility of threatening safety of the driver. It is possible to motivate the driver to repair the external recognition sensor that has failed while at the same time ensuring safety of the driver by stopping automatic driving and imposing the task of manual driving on the driver.

Meanwhile, when the mode determiner 150 has received, from the recognizer 130, information indicating that a failure has occurred in at least one of the external recognition sensors and the external recognition sensor that has failed is only the LIDAR 14, the mode determiner 150 changes the mode A or the mode B to the mode C for a predetermined period, and then changes the mode C to the mode E. Driving assistance such as ACC or LKAS may be performed under the state of the mode C in this predetermined period. This is because when a failure has occurred in only the LIDAR 14, it is possible to continue driving in the mode C temporarily by using the camera 10 and the radar device 12. As a result, it is possible to prevent the driver from feeling strange due to the driving mode being switched from the mode A or the mode B to the mode E abruptly.

Figure 4:
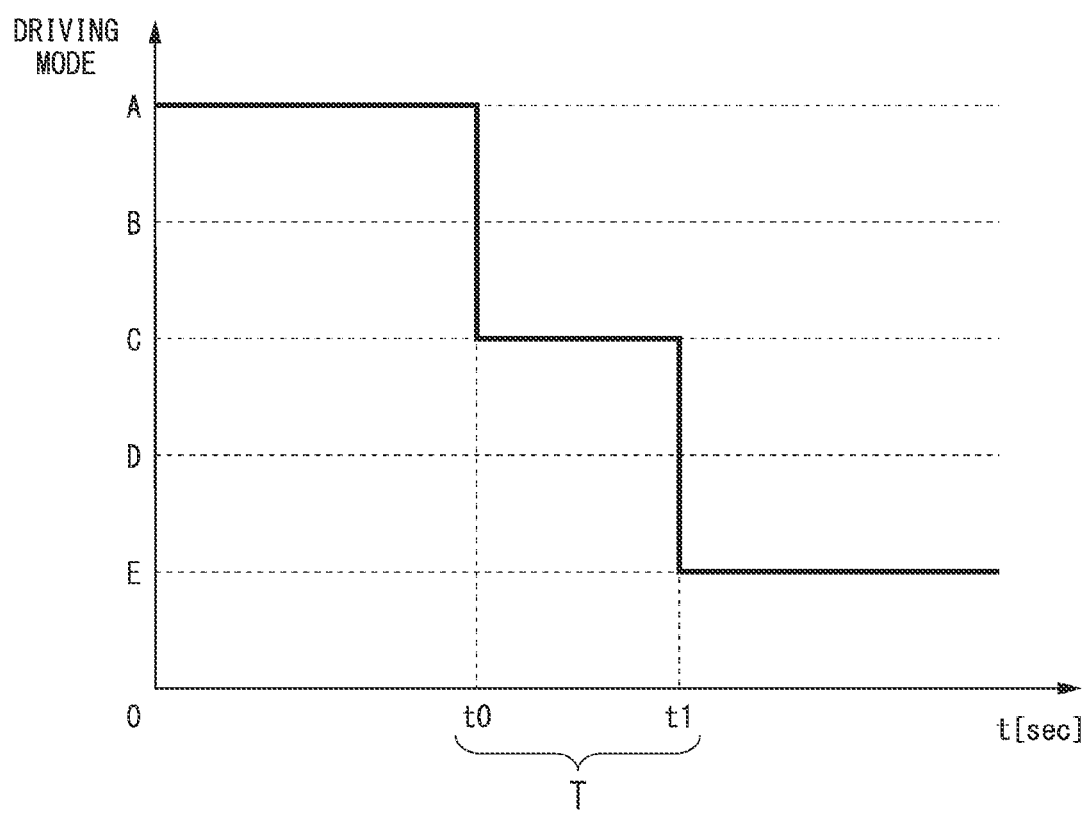
FIG. 4 is a diagram illustrating processing to be executed by a mode determiner when a failure has occurred in only the LIDAR.

FIG. 4 is a diagram illustrating processing to be executed by the mode determiner 150 when a failure has occurred in only the LIDAR. As illustrated in FIG. 4, the own vehicle M is traveling in the mode A before a time point t0, and at the time point t0, the own vehicle M receives, from the recognizer 130, information indicating that a failure has occurred in only the LIDAR 14 among the external recognition sensors. At this time, the mode determiner 150 changes the driving mode from the mode A to the mode C, and causes the driver to grasp the steering wheel 82 while at the same time continuing driving in the mode C temporarily by using the camera 10 and the radar device 12. Then, after a predetermined period T has elapsed, at a time point t1, the mode determiner 150 changes the driving mode from the mode C to the mode E, and imposes the task of manual driving on the driver. In this manner, when a failure has occurred in only the LIDAR 14, the mode determiner 150 changes the driving mode to the mode C temporarily, and then to the mode E. As a result, it is possible to ensure safety of the driver without causing the driver to feel strange.

In the example of FIG. 4, when a failure has occurred in only the LIDAR 14, the mode determiner 150 sets the driving mode to the mode C for a predetermined period T. However, the configuration is not limited thereto, and for example, the mode determiner 150 may set the driving mode to the mode C until the own vehicle M has travelled for a predetermined distance, and after that, the mode determiner 150 may change the driving mode to the mode E. Also with this configuration, it is possible to ensure safety of the driver without causing the driver to feel strange.

Figure 5:
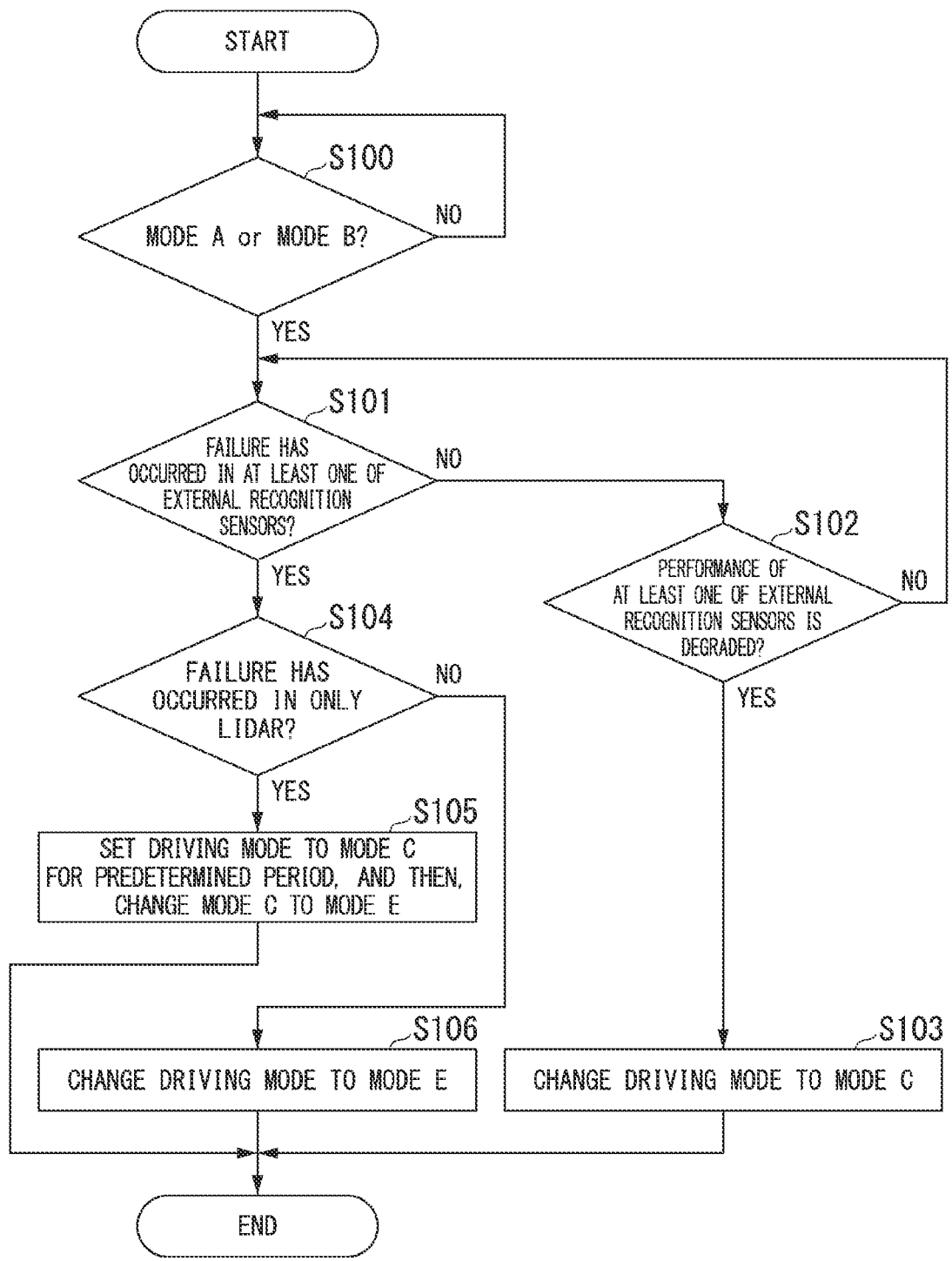
FIG. 5 is a flow chart illustrating an example of a flow of processing to be executed by a recognizer and the mode determiner according to the first embodiment.

Next, description is given of an example of processing to be executed by the recognizer 130 and the mode determiner 150 when degradation in performance or a failure has occurred in an external recognition sensor. FIG. 5 is a flow chart illustrating an example of a flow of processing to be executed by the recognizer 130 and the mode determiner 150 according to the first embodiment.

First, the mode determiner 150 determines whether or not the current driving mode is the mode A or the mode B (Step S100). When the mode determiner 150 has determined that the current driving mode is the mode A or the mode B, the recognizer 130 determines whether or not a failure has occurred in at least one of the external recognition sensors (Step S101). When a failure has not occurred in at least one of the external recognition sensors, the recognizer 130 determines whether or not performance of at least one of the external recognition sensors is degraded (Step S102). When the recognizer 130 has determined that performance of at least one of the external recognition sensors is not degraded, the recognizer 130 returns the processing to Step S101. On the other hand, when the recognizer 130 has determined that performance of at least one of the external recognition sensors is degraded, the mode determiner 150 changes the driving mode from the mode A or the mode B to the mode C (Step S103).

When the recognizer 130 has determined that a failure has occurred in at least one of the external recognition sensors, the recognizer 130 next determines whether or not a failure has occurred in only the LIDAR 14 (Step S104). When the recognizer 130 has determined that a failure has occurred in only the LIDAR 14, the mode determiner 150 sets the driving mode to the mode C for a predetermined period, and after that, the mode determiner 150 changes the mode C to the mode E (Step S105). On the other hand, when the recognizer 130 has determined that a failure has not occurred in only the LIDAR 14, the mode determiner 150 changes the driving mode to the mode E (Step S106).

According to the first embodiment described above, the mode determiner 150 changes the driving mode from the mode A or the mode B depending on degradation in performance or a failure of the external recognition sensor. Therefore, it is possible to perform appropriate control when an abnormality has occurred in a sensor required for automatic driving.

Second Embodiment

In the first embodiment described above, when it is determined that performance of at least one of the external recognition sensors is degraded, the driving mode is changed to the mode C. In contrast, in a second embodiment, even in a case where performance of at least one of the external recognition sensors is determined to be degraded, when the external recognition sensor whose performance is degraded is installed on the back side of the own vehicle M, driving in the mode A or the mode B is continued. This is because an external recognition sensor installed on the back side of the own vehicle M influences performance of automatic driving less than an external recognition sensor installed on the front side of the own vehicle M.

Figure 6:
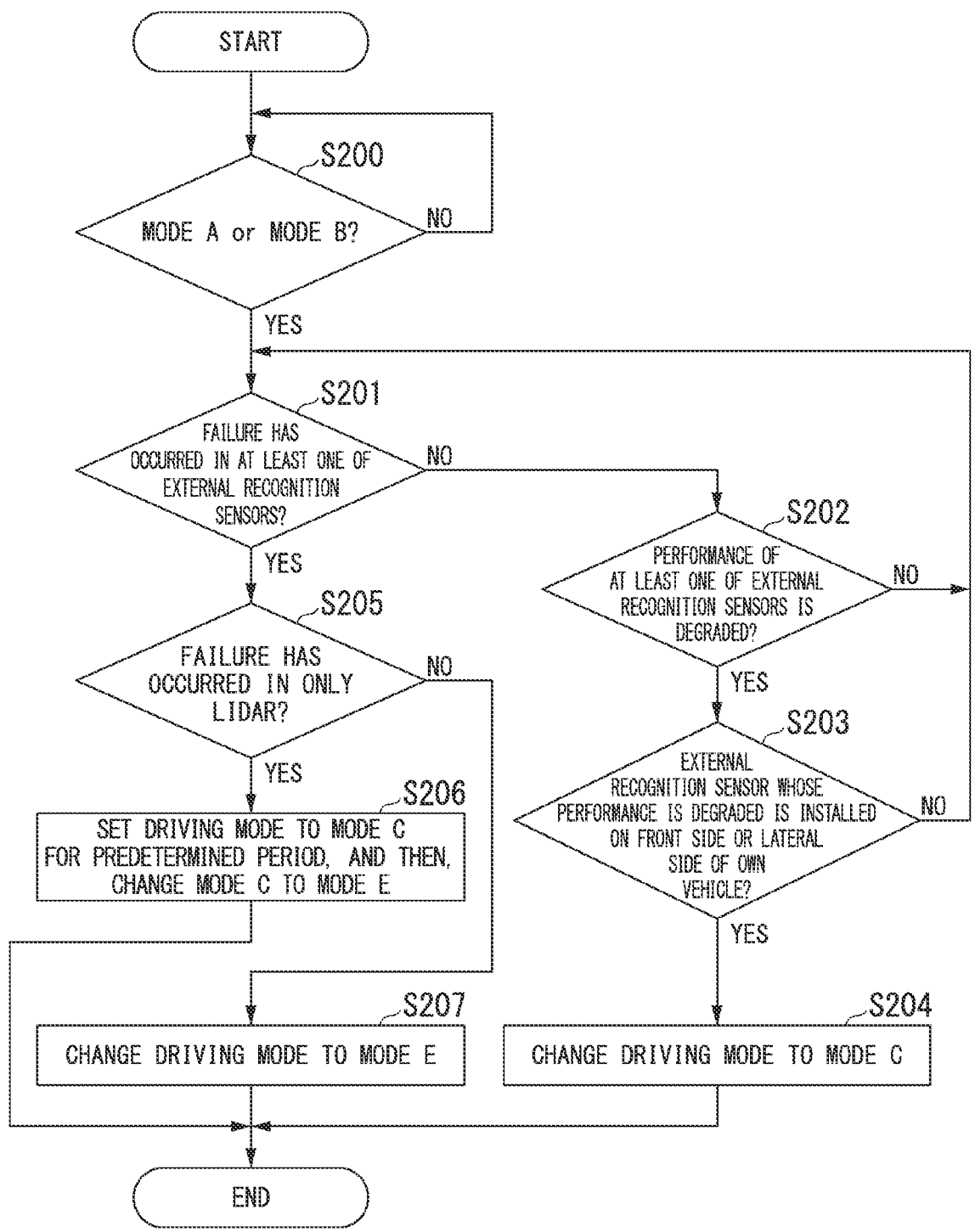
FIG. 6 is a flow chart illustrating an example of a flow of processing to be executed by a recognizer and a mode determiner according to a second embodiment.

FIG. 6 is a flow chart illustrating an example of a flow of processing to be executed by the recognizer 130 and the mode determiner 150 according to the second embodiment.

First, the mode determiner 150 determines whether or not the current driving mode is the mode A or the mode B (Step S200). When the mode determiner 150 has determined that the current driving mode is the mode A or the mode B, the recognizer 130 determines whether or not a failure has occurred in at least one of the external recognition sensors (Step S201). When a failure has not occurred in at least one of the external recognition sensors, the recognizer 130 determines whether or not performance of at least one of the external recognition sensors is degraded (Step S202). When the recognizer 130 has determined that performance of at least one of the external recognition sensors is not degraded, the recognizer 130 returns the processing to Step S101. On the other hand, when the recognizer 130 has determined that performance of at least one of the external recognition sensors is degraded, the recognizer 130 determines whether the external recognition sensor whose performance is degraded is installed on the front side or lateral side of the own vehicle M (Step S203). When the recognizer 130 has determined that the external recognition sensor whose performance is degraded is installed on the front side or lateral side of the own vehicle M, the mode determiner 150 changes the driving mode from the mode A or the mode B to the mode C (Step S204). On the other hand, when the recognizer 130 has determined that the external recognition sensor whose performance is degraded is not installed on the front side or lateral side of the own vehicle M, that is, when the recognizer 130 has determined that the external recognition sensor whose performance is degraded is not installed on the back side of the own vehicle M, the recognizer 130 returns the processing to Step S201. The processing of from Step S205 to Step S207 is similar to the processing of from Step S104 to Step S106 described above.

According to the second embodiment described above, when an external recognition sensor whose performance is degraded is installed on the back side of the own vehicle M, the mode determiner 150 keeps the driving mode in the mode A or the mode B, and thus it is possible to perform more appropriate control without impairing the convenience for the driver.

In the first embodiment and second embodiment described above, when it is determined that performance of an external recognition sensor is degraded, the driving mode is changed to the mode C, or when it is determined that a failure has occurred in the external recognition sensor, the driving mode is changed to the mode E. However, the configuration is not limited thereto, and the driving mode after change may be a mode equal to or lower than the mode C.

Furthermore, the first embodiment and second embodiment described above relate to degradation in performance or a failure of the external recognition sensor. However, the processing of the present invention is not solely directed to degradation in performance or a failure of the external recognition sensor, and can be applied to a sensor required for automatic driving in general. For example, when a failure has occurred in an accelerator pedal position sensor mounted to an accelerator pedal of the driving operator 80, an operation performed by the driver cannot be identified. In this case, the mode determiner 150 may not be able to identify a driving state that depends on the state of the own vehicle M, and thus the mode determiner 150 may change the driving mode from the mode A or the mode B to the mode C or a mode lower than the mode C. Furthermore, for example, when a redundant part forming a redundant architecture, which achieves the function of automatic driving, has failed, the mode determiner 150 may change the driving mode to the mode C or a mode lower than the mode C and cause the driver to grasp the steering wheel 82 to prepare for an emergency.

This concludes the description of the embodiment for carrying out the present invention. The present invention is not limited to the embodiment in any manner, and various kinds of modifications and replacements can be made within a range that does not depart from the gist of the present invention.

What is claimed is:

1. A vehicle control device, comprising:
one or more storage devices storing a program; and
one or more hardware processors, the one or more hardware processors executing the program stored in the one or more storage devices to:
recognize a surrounding situation of a vehicle;
control steering and acceleration/deceleration of the vehicle based on the recognized surrounding situation without depending on an operation performed by a driver of the vehicle;
detect operation states of a plurality of external recognition sensors;
determine a driving mode of the vehicle as any one of a plurality of driving modes including a first driving mode, a second driving mode, and a third driving mode, wherein the third driving mode is a driving mode in which a load of a task imposed on the driver is smaller than a load of a task imposed in the second driving mode, wherein the second driving mode is a driving mode in which a load of a task imposed on the driver is smaller than a load of a task imposed in the first driving mode, wherein a part of the plurality of driving modes including at least the second driving mode and the third driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load;
change the third driving mode to either one of the first driving mode and the second driving mode based on the operation states when determining based on the operation states that a failure has occurred in at least one of the plurality of external recognition sensors;
change the third driving mode to the second driving mode when determining based on the operation states that degradation in performance, which is a phenomenon different from the failure, has occurred in at least one of the plurality of external recognition sensors; and
continue the third driving mode when determining that a failure has occurred in at least one of the plurality of external recognition sensors and the at least one of the plurality of external recognition sensors that has failed is installed on a back side of the vehicle.

2. The vehicle control device according to claim 1, wherein the plurality of external recognition sensors include at least a radar, a camera, and a LIDAR, wherein, when determining that a failure has occurred in only the LIDAR among the plurality of external recognition sensors, the one or more hardware processors set the third driving mode to the second driving mode for a predetermined period, and change the second driving mode to the first driving mode after continuing driving in the second driving mode by using the radar and the camera, and
wherein the one or more hardware processors change the third driving mode to the first driving mode when determining a failure has occurred in at least one of the radar and the camera.

3. The vehicle control device according to claim 1, wherein the plurality of external recognition sensors include at least a radar, a camera, and a LIDAR, wherein, when determining that a failure has occurred in only the LIDAR among the plurality of external recognition sensors, the one or more hardware processors set the third driving mode to the second driving mode for a predetermined period, and change the second driving mode to the first driving mode after enabling a function of causing the vehicle to follow a preceding vehicle while keeping a constant inter-vehicle distance between the vehicle and the preceding vehicle; and a function of assisting the vehicle in keeping a lane so as to travel within a lane in which the vehicle is traveling.

4. The vehicle control device according to claim 1, wherein the third driving mode is a driving mode in which a task of grasping an operator that receives a steering operation is not imposed on the driver or a task of monitoring a surrounding situation is not imposed on the driver,
wherein the second driving mode is a driving mode in which the task of monitoring a surrounding situation and the task of grasping an operator are imposed on the driver, and
wherein the first driving mode is a driving mode in which a task of steering or accelerating/decelerating the vehicle is imposed on the driver.

5. The vehicle control device according to claim 1, wherein the degradation in performance is a phenomenon in which performance of at least one of the plurality of external recognition sensors is degraded but is capable of recovered to normal performance.

6. The vehicle control device according to claim 5, wherein the one or more hardware processors change the driving mode from the second driving mode to the third driving mode when determining that performance of at least one of the plurality of external recognition sensors is degraded and then has recovered to the normal performance.

7. The vehicle control device according to claim 5, wherein the one or more hardware processors change the second driving mode to the third driving mode when determining that performance of at least one of the plurality of external recognition sensors is degraded and then has recovered to the normal performance after elapse of a predetermined period.

8. A vehicle control method to be executed by a computer mounted on a vehicle, the vehicle control method comprising:
recognizing a surrounding situation of a vehicle;
controlling steering and acceleration/deceleration of the vehicle based on the recognized surrounding situation without depending on an operation performed by a driver of the vehicle;
detecting operation states of a plurality of external recognition sensors;
determining a driving mode of the vehicle as any one of a plurality of driving modes including a first driving mode, a second driving mode, and a third driving mode, wherein the third driving mode is a driving mode in which a load of a task imposed on the driver is smaller than a load of a task imposed in the second driving mode, wherein the second driving mode is a driving mode in which a load of a task imposed on the driver is smaller than a load of a task imposed in the first driving mode, wherein a part of the plurality of driving modes including at least the second driving mode and the third driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load;
changing the third driving mode to either one of the first driving mode and the second driving mode based on the operation states when determining based on the operation states that a failure has occurred in at least one of the plurality of external recognition sensors;
changing the third driving mode to the second driving mode when determining based on the operation states that degradation in performance, which is a phenomenon different from the failure, has occurred in at least one of the plurality of external recognition sensors; and
continuing the third driving mode when determining that a failure has occurred in at least one of the plurality of external recognition sensors and the at least one of the plurality of external recognition sensors that has failed is installed on a back side of the vehicle.

9. A computer-readable non-transitory storage medium having stored thereon a program for causing a computer mounted on a vehicle to:
recognize a surrounding situation of a vehicle;
control steering and acceleration/deceleration of the vehicle based on the recognized surrounding situation without depending on an operation performed by a driver of the vehicle;
detect operation states of a plurality of external recognition sensors;
determine a driving mode of the vehicle as any one of a plurality of driving modes including a first driving mode, a second driving mode, and a third driving mode, wherein the third driving mode is a driving mode in which a load of a task imposed on the driver is smaller than a load of a task imposed in the second driving mode, wherein the second driving mode is a driving mode in which a load of a task imposed on the driver is smaller than a load of a task imposed in the first driving mode, wherein a part of the plurality of driving modes including at least the second driving mode and the third driving mode is performed by controlling steering and acceleration/deceleration of the vehicle without depending on an operation performed by the driver of the vehicle, and wherein when a task in the determined driving mode is not performed by the driver, the driving mode of the vehicle is changed to a driving mode imposing a larger task load;
change the third driving mode to either one of the first driving mode and the second driving mode based on the operation states when determining based on the operation states that a failure has occurred in at least one of the plurality of external recognition sensors;
change the third driving mode to the second driving mode when determining based on the operation states that degradation in performance, which is a phenomenon different from the failure, has occurred in at least one of the plurality of external recognition sensors; and
continue the third driving mode when determining that a failure has occurred in at least one of the plurality of external recognition sensors and the at least one of the plurality of external recognition sensors that has failed is installed on a back side of the vehicle.

* * * * *